Sheet 1 3Sheets.
W. E. Underwood.
Fulling Machine.
N° 9492
Patented Dec. 21, 1852.
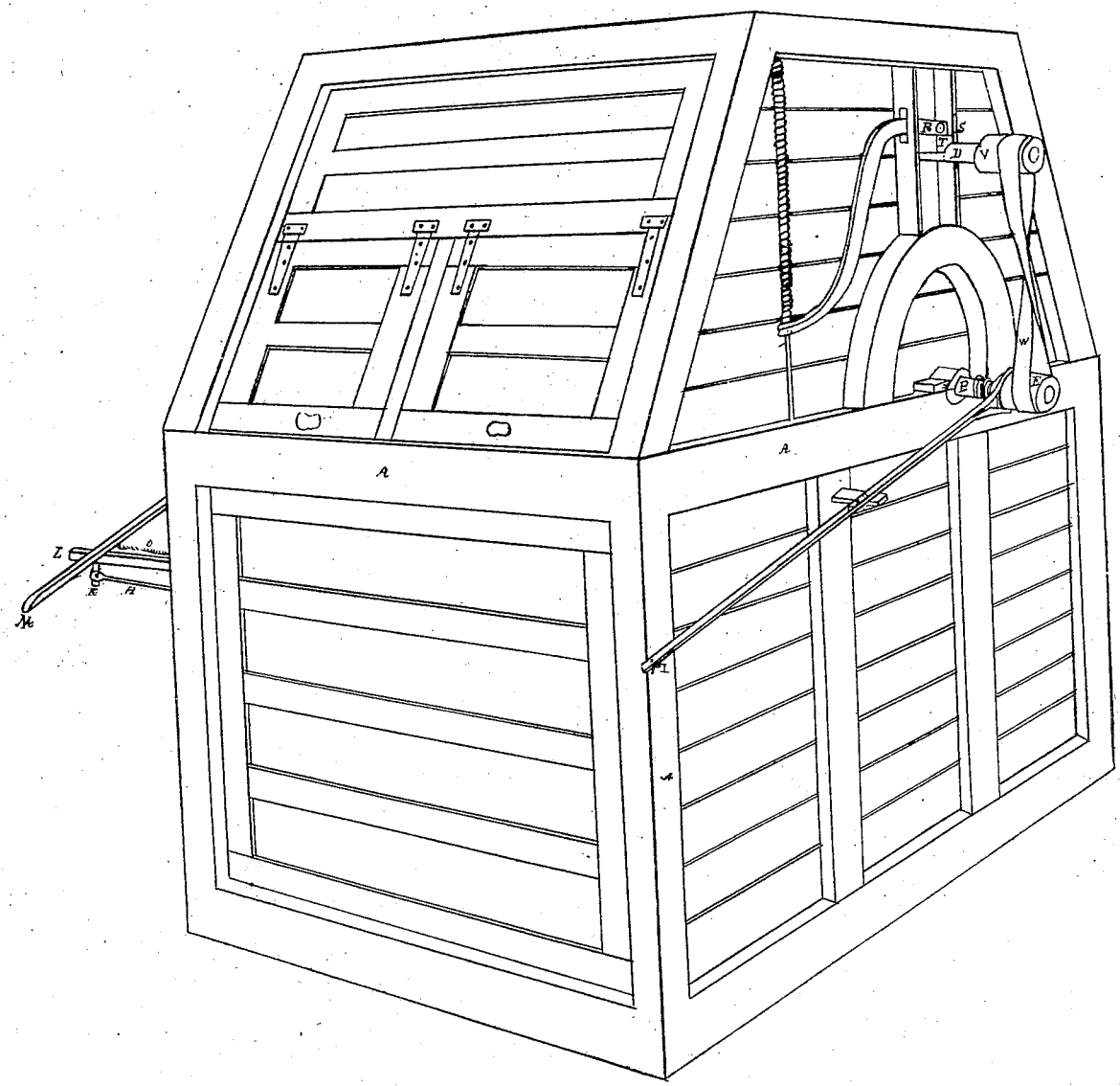

W. E. Underwood
Fulling Machine.
Nº 9492.  Patented Dec. 21, 1852.
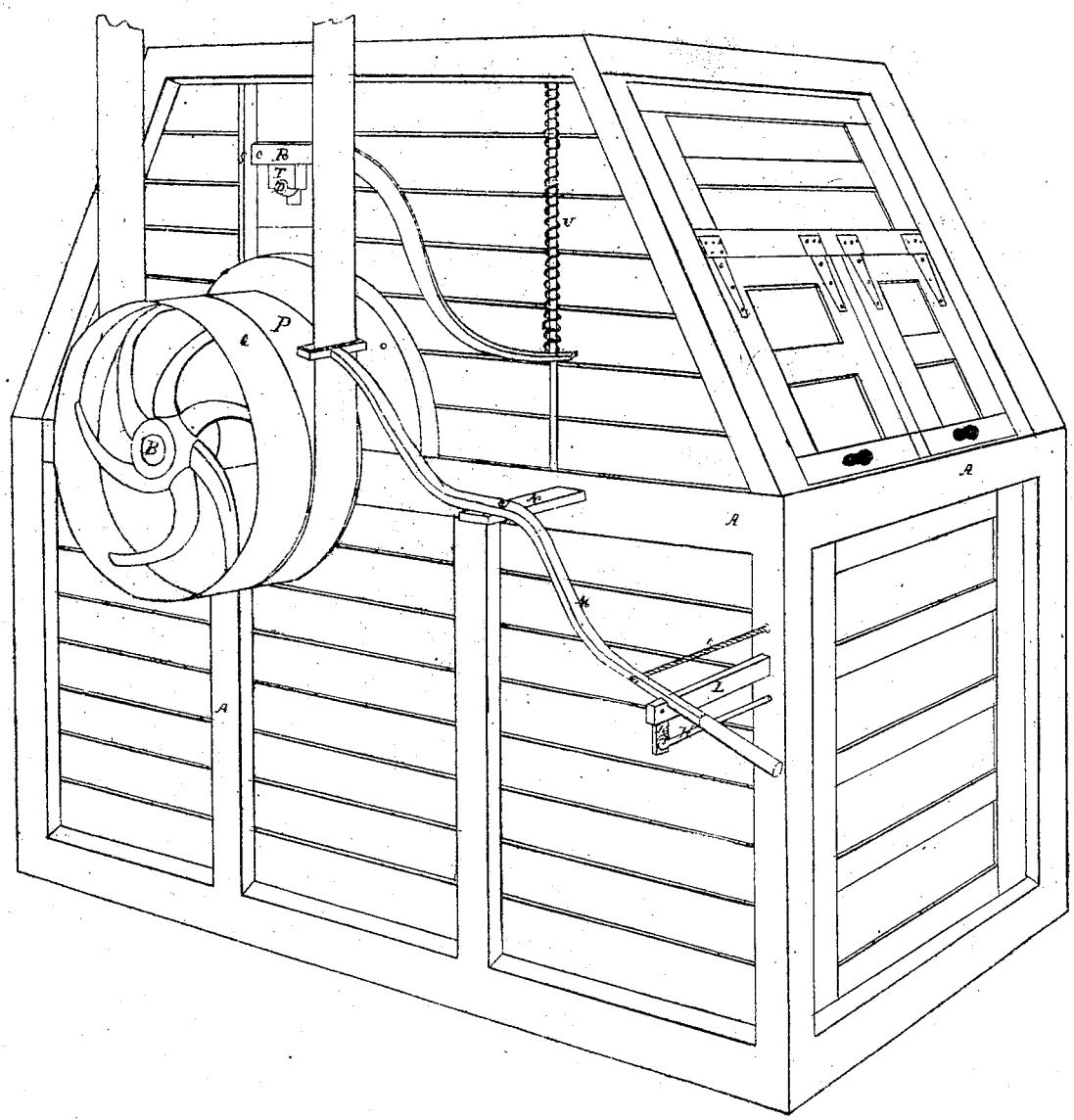

W. E. Underwood.
Fulling Machine.
Nº 9492. Patented Dec. 21, 1852.
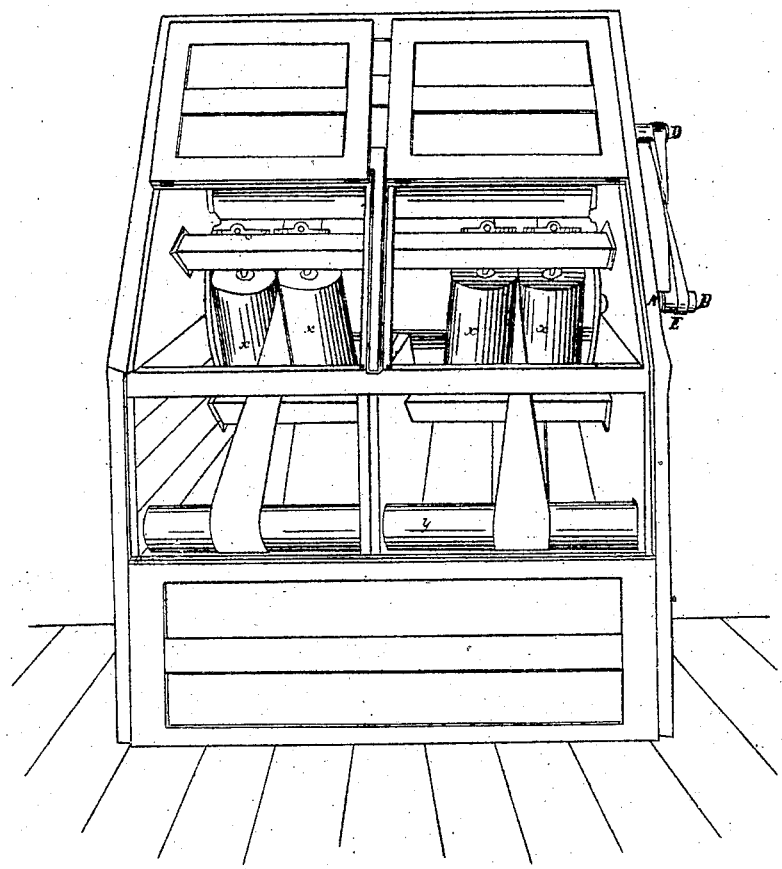

UNITED STATES PATENT OFFICE.

WILLIAM E. UNDERWOOD, OF MIDDLEFIELD, MASSACHUSETTS.

FULLING-MILL.

Specification of Letters Patent No. 9,492, dated December 21, 1852.

*To all whom it may concern:*

Be it known that I, WILLIAM E. UNDERWOOD, of Middlefield, in the county of Hampshire and State of Massachusetts, have invented a new and useful Improvement in the Construction of Rotary Fulling-Mills; and I do hereby declare that the following is a full and exact description thereof, reference being had to the accompanying drawings and the letters of reference marked thereon, Figure 1 representing one side of the machine and Fig. 2 the other and Fig. 3 the interior.

The nature of my invention consists in providing an attachment to the rotary fulling mill which will in case of the entanglement or knotting of the endless chain of cloth causing one of the compressing rollers to slip on the cloth, that the driving belt will be thrown off, thereby, stopping the machine and preventing the cloth from being damaged by the compressing rollers.

To enable others skilled in the art to make and use my invention I will proceed to describe its construction and operation.

I construct my machine with a large horizontal cylinder, the shaft of which is seen in the drawings at B in each of the figures and the cylinder is seen in Fig. 3 and is driven by the pulley P, Fig. 2. Another cylinder of the same size is placed directly over the first, the shaft of which is seen at D in the figure and the cylinder is partly seen in Fig. 3. Directly forward of the cylinders B and D are placed two pairs of upright cylinders smaller than B and D, seen in Fig. 3, marked *x*. A horizontal friction roller is placed forward of the upright cylinders and seen in Fig. 3, marked *y*. On the shaft B near one end an endless male screw is cut with the thread raised above the shaft with a bearing on each side of the screw. A small loose pulley E is placed on the shaft B, with a female screw cut on the side next the frame A, fitted to the male screw on the shaft B. The female screw in the pulley E is of the same length as the bearing on the inside of the male screw on the shaft B, and beyond the female screw a portion of the inside of the pulley E is cut away, so as to be larger than the male screw, so that when the pulley E is slipped over the male screw on the shaft B it will turn on the shaft B without touching the screw on the shaft B, the male screw being then in the center of the pulley E. A groove is turned near one end of the pulley E, in which is placed the fork F, which is hung on a pivot G, and connected by a pivot with the rod H at I. The other end of the rod H is connected by a pivot to the tumbler K, which is attached to the arm L by a pivot.

M is a lever with a belt guide at one end, the other end resting in a notch in the arm L and connected to the arm N by a pivot.

O is a cord or rod attached to the lever M, and passing over a pulley, with a weight at the other end.

P is the driving pulley on the shaft B.

Q is a loose pulley on the shaft B.

R R are levers attached by pivots S S to the frame A.

T T are metallic boxes resting on the bearings on the shaft D, and held down by the levers R, R.

U, U, are springs attached to the levers R R.

V is a small pulley on the shaft D.

W is an elastic belt connecting the pulley E and V.

Having described the different parts of the machine, I now proceed to describe its operation.

The end of the cloth to be pulled is passed between the horizontal cylinders B and D, and then passed between the upright rollers *x x*. It is then passed over the friction roller *y* in front of the upright cylinders. It is then passed under the cylinder B, and the two ends of the cloth are then sewed together, forming an endless chain. The cylinder B is then put in motion, revolving toward the back of the machine, (*i. e.*, the upper part of the cylinder moves in that direction while the under part of course moves toward the front part of the machine,) which feeds in the cloth, and the friction of the cloth causes the cylinder D to revolve in an opposite direction, as well as the upright rollers also, which revolve in opposite directions. Now if by any cause the endless chain of cloth is entangled or knotted the knot is caught by the cylinders, and as they are all except the driving cylinder B moved by the friction of the endless chain of cloth it causes all the cylinders except the driving cylinder B to stop. When the upper cylinder D is stopped it causes the pulley V, which is attached to the shaft D, to stop also the pulley E, and the elastic belt W is held by it and with it the small pulley E is prevented from turning, which causes the male screw on the shaft B to connect with the female screw in the inside of the pulley E and pass into the center of it, thereby shifting the position of the pulley E on the shaft B and carrying with it the fork F, which being connected with the rod H at I will draw the rod H in the direction of I, and being connected with the tumbler K, which on being moved by the rod H raises the lever M out of the notch in the arm L, when the cord O, with the weight attached, draws the lever M instantly in the direction of I, which causes the other end of the lever M, having the belt guide, to move in the opposite direction, thereby shifting the belt from the driving pulley P to the loose pulley Q, thereby stopping the machine.

What I claim and desire to secure by Letters Patent is—

The combination of the stop mechanism or its equivalent with the screw pulley, and the elastic band leading to the pulley, on the upper roller, whereby the whole machine is stopped, when the motion of the cloth is arrested in the manner described, and ceases to impart motion to the upper roller.

W. E. UNDERWOOD.

Witnesses:
O. CUNNINGHAM,
JOHN SMITH.